(12) United States Patent
Smith et al.

(10) Patent No.: US 9,002,951 B2
(45) Date of Patent: *Apr. 7, 2015

(54) WEB GATEWAY MULTI-CARRIER SUPPORT

(75) Inventors: Richard A. Smith, Annapolis, MD (US); Nikhil Bhadange, Annapolis, MD (US)

(73) Assignee: TeleCommunication Systems, Inc., Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 11/902,714

(22) Filed: Sep. 25, 2007

(65) Prior Publication Data

US 2008/0313288 A1     Dec. 18, 2008

Related U.S. Application Data

(63) Continuation of application No. 09/716,944, filed on Nov. 22, 2000, now Pat. No. 7,519,654.

(51) Int. Cl.
| | | |
|---|---|---|
| *G06F 15/16* | (2006.01) | |
| *H04L 12/58* | (2006.01) | |
| *H04W 88/16* | (2009.01) | |
| *H04W 4/14* | (2009.01) | |

(52) U.S. Cl.
CPC ......... *H04L 12/5835* (2013.01); *H04L 12/5895* (2013.01); *H04L 51/066* (2013.01); *H04W 4/14* (2013.01); *H04W 88/16* (2013.01)

(58) Field of Classification Search
USPC .................. 709/203–207, 238–245, 217–229
See application file for complete search history.

(56) References Cited

U.S. PATENT DOCUMENTS

| | | | |
|---|---|---|---|
| 1,103,073 | A | 7/1914 | O'Connel |
| 4,494,119 | A | 1/1985 | Wimbush |
| 4,651,156 | A | 3/1987 | Martinez |
| 4,706,275 | A | 11/1987 | Kamil |
| 4,891,638 | A | 1/1990 | Davis |
| 4,891,650 | A | 1/1990 | Sheffer |

(Continued)

FOREIGN PATENT DOCUMENTS

WO     WO 97/41654     11/1997

OTHER PUBLICATIONS

Wollrath Java-centric distributed computing Micro, I EEE, vol. 17 Issue 3, May-Jun. 1997 pp. 44-53.

(Continued)

*Primary Examiner* — Yasin Barqadle
(74) *Attorney, Agent, or Firm* — William H. Bollman (57) ABSTRACT

Wireless Internet gateway (WIG) providing multicarrier support that allows the gateway to send message to other peer gateways including a Message Distribution Center (MDS) trough which short messages are routed to other carriers based on carrier formats stored in a lookup table. Carrier format tables may be updated rather than employing an Internet gateway program thereby reducing downtime for updating, reducing the complexity of updates, and improving reliability during changes in a subscriber carrier. The WIG communicates with other carrier gateways utilizing different or varying protocols. Information regarding other carriers may be added, changed, and/or removed by modifying a configuration property file relating to the message format for other carriers, rather than by providing each carrier with its own class thereby avoiding a need to reprogram sending gateways.

10 Claims, 7 Drawing Sheets

(56) References Cited

U.S. PATENT DOCUMENTS

| | | |
|---|---|---|
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Droro et al. |
| 5,119,104 A | 6/1992 | Heller |
| 5,144,283 A | 9/1992 | Arens et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moodey et al. |
| 5,239,570 A | 8/1993 | Koster et al. |
| 5,266,944 A | 11/1993 | Carrol et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,410,598 A | 4/1995 | Shear |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,719,918 A | 2/1998 | Serbetciouglu |
| 5,740,534 A | 4/1998 | Ayerst et al. |
| 5,754,636 A * | 5/1998 | Bayless et al. ............ 379/142.1 |
| 5,758,088 A | 5/1998 | Bezaire et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vantilla et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,828,740 A | 10/1998 | Khuc et al. |
| 5,856,974 A | 1/1999 | Gervais |
| 5,903,726 A | 5/1999 | Donovan et al. |
| 5,905,736 A | 5/1999 | Rohen et al. |
| 5,917,900 A * | 6/1999 | Allison et al. ................ 379/229 |
| 5,920,821 A | 7/1999 | Seaholtz et al. |
| 5,930,701 A | 7/1999 | Skog |
| 5,941,945 A | 8/1999 | Aditham |
| 5,943,399 A | 8/1999 | Bannister et al. |
| 5,946,629 A | 8/1999 | Sawyer et al. |
| 5,946,630 A | 8/1999 | Willars et al. |
| 5,950,130 A | 9/1999 | Coursey |
| 5,953,398 A | 9/1999 | Hill |
| 5,959,543 A | 9/1999 | LaPorta |
| 5,960,074 A | 9/1999 | Clark |
| 5,963,864 A | 10/1999 | O'Neil et al. |
| 5,974,054 A | 10/1999 | Couts et al. |
| 5,974,458 A * | 10/1999 | Abe et al. ...................... 709/224 |
| 5,978,685 A | 11/1999 | Laiho |
| 5,987,323 A | 11/1999 | Huotari |
| 5,999,811 A | 12/1999 | Molne |
| 6,023,470 A * | 2/2000 | Lee et al. ...................... 370/401 |
| 6,035,025 A | 3/2000 | Hanson |
| 6,044,265 A * | 3/2000 | Roach, Jr. ..................... 455/419 |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,081,508 A * | 6/2000 | West et al. .................... 370/238 |
| 6,088,443 A * | 7/2000 | Darland et al. .......... 379/265.13 |
| 6,101,378 A | 8/2000 | Barabash et al. |
| 6,122,503 A | 9/2000 | Daly |
| 6,122,520 A | 9/2000 | Want et al. |
| 6,131,024 A | 10/2000 | Boltz |
| 6,138,158 A | 10/2000 | Boyle |
| 6,144,653 A | 11/2000 | Persson et al. |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,175,922 B1 | 1/2001 | Wang |
| 6,181,935 B1 | 1/2001 | Gossman et al. |
| 6,188,752 B1 | 2/2001 | Lesley |
| 6,189,031 B1 | 2/2001 | Badger et al. |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,208,870 B1 | 3/2001 | Lorello |
| 6,216,008 B1 | 4/2001 | Lee et al. |
| 6,223,042 B1 | 4/2001 | Raffel et al. |
| 6,223,046 B1 | 4/2001 | Hamill-Keays et al. |
| 6,226,529 B1 | 5/2001 | Bruno et al. |
| 6,244,758 B1 | 6/2001 | Solymar |
| 6,246,879 B1 | 6/2001 | Segura et al. |

(56) References Cited

U.S. PATENT DOCUMENTS

| | | |
|---|---|---|
| 6,249,680 B1 | 6/2001 | Wax et al. |
| 6,249,744 B1 | 6/2001 | Morita |
| 6,263,212 B1 | 7/2001 | Ross et al. |
| 6,263,372 B1 | 7/2001 | Hogan et al. |
| 6,266,614 B1 | 7/2001 | Alumbaugh |
| 6,289,095 B1 * | 9/2001 | Buttitta et al. ........... 379/220.01 |
| 6,289,373 B1 | 9/2001 | Dezonno |
| 6,301,695 B1 | 10/2001 | Burnham |
| 6,311,055 B1 | 10/2001 | Boltz |
| 6,314,108 B1 | 11/2001 | Ramasubramani |
| 6,317,594 B1 | 11/2001 | Gossman et al. |
| 6,327,479 B1 | 12/2001 | Mikkola |
| 6,330,600 B1 | 12/2001 | Matchefts et al. |
| 6,366,961 B1 | 4/2002 | Subbiah et al. |
| 6,393,014 B1 | 5/2002 | Daly |
| 6,396,913 B1 | 5/2002 | Perkins, III |
| 6,408,177 B1 | 6/2002 | Parikh et al. |
| 6,421,707 B1 | 7/2002 | Miller |
| 6,421,733 B1 | 7/2002 | Tso |
| 6,424,841 B1 | 7/2002 | Gustafsson |
| 6,430,540 B1 | 8/2002 | Guidice et al. |
| 6,446,112 B1 | 9/2002 | Bunney |
| 6,446,969 B1 | 9/2002 | Denoual |
| 6,456,852 B2 | 9/2002 | Bar |
| 6,459,892 B2 | 10/2002 | Burgan |
| 6,463,145 B1 | 10/2002 | O'Neal et al. |
| 6,470,181 B1 | 10/2002 | Maxwell |
| 6,487,180 B1 | 11/2002 | Borgstahl |
| 6,493,430 B2 | 12/2002 | Leuca |
| 6,507,589 B1 | 1/2003 | Ramasubramani et al. |
| 6,512,930 B2 | 1/2003 | Sandegren |
| 6,538,561 B2 | 3/2003 | Angus |
| 6,560,456 B1 | 5/2003 | Lohtia et al. |
| 6,567,979 B1 | 5/2003 | deCarmo |
| 6,587,691 B1 | 7/2003 | Granstam et al. |
| 6,615,041 B2 * | 9/2003 | Adamany et al. ........... 455/432.1 |
| 6,618,763 B1 | 9/2003 | Steinberg |
| 6,625,461 B1 | 9/2003 | Bertacchi |
| 6,654,786 B1 | 11/2003 | Fox |
| 6,658,260 B2 | 12/2003 | Knotts |
| 6,674,767 B1 | 1/2004 | Kadyk |
| 6,681,257 B1 * | 1/2004 | Patel et al. ................ 709/245 |
| 6,711,411 B1 | 3/2004 | Ruffini |
| 6,718,178 B1 | 4/2004 | Sladek et al. |
| 6,760,324 B1 * | 7/2004 | Scott et al. ................ 370/352 |
| 6,771,971 B2 | 8/2004 | Smith |
| 6,826,597 B1 | 11/2004 | Lonroth |
| 6,850,916 B1 | 2/2005 | Wang |
| 6,856,804 B1 | 2/2005 | Ciotta |
| 6,886,017 B1 | 4/2005 | Jackson et al. |
| 6,915,138 B2 | 7/2005 | Kraft |
| 6,963,640 B1 * | 11/2005 | Manning ................ 379/355.08 |
| 6,987,969 B1 | 1/2006 | Bruing |
| 6,993,325 B1 | 1/2006 | Waesterlid |
| 7,010,303 B2 | 3/2006 | Lewis |
| 7,058,036 B1 | 6/2006 | Yu |
| 7,069,439 B1 | 6/2006 | Chen |
| 7,088,990 B1 | 8/2006 | Isomursu |
| 7,116,972 B1 | 10/2006 | Zhang |
| 7,154,901 B2 | 12/2006 | Chava et al. |
| 7,181,538 B2 | 2/2007 | Tam et al. |
| 7,197,661 B1 | 3/2007 | Reynolds |
| 7,224,696 B2 | 5/2007 | Bouleros |
| 7,239,629 B1 * | 7/2007 | Olshansky et al. ........... 370/353 |
| 7,260,836 B2 | 8/2007 | Roskind |
| 7,318,098 B2 | 1/2008 | Steinberg |
| RE40,243 E | 4/2008 | Leuca |
| 7,366,529 B2 | 4/2008 | Alanara |
| 7,409,428 B1 | 8/2008 | Brabec |
| 7,486,641 B2 | 2/2009 | Reddy |
| 7,509,136 B2 | 3/2009 | Hart |
| 7,519,654 B1 | 4/2009 | Smith |
| RE40,780 E | 6/2009 | Leuca |
| 7,577,431 B2 | 8/2009 | Jiang |
| 7,590,225 B2 | 9/2009 | Sivula |
| 7,627,305 B2 | 12/2009 | Helferich |
| 7,761,511 B2 | 7/2010 | Kaplan |
| 7,809,382 B2 | 10/2010 | Smith |
| 7,860,068 B2 | 12/2010 | Smith |
| 7,890,127 B2 | 2/2011 | Knotts |
| 7,991,411 B2 | 8/2011 | Johnson |
| 2001/0034224 A1 | 10/2001 | McDowell |
| 2001/0041579 A1 | 11/2001 | Smith et al. |
| 2002/0143946 A1 | 10/2002 | Crosson |
| 2003/0040300 A1 | 2/2003 | Bodic |
| 2003/0055912 A1 | 3/2003 | Martin, Jr. et al. |
| 2003/0092454 A1 | 5/2003 | Halim |
| 2003/0163730 A1 | 8/2003 | Roskind |
| 2003/0193967 A1 | 10/2003 | Fenton |
| 2004/0148357 A1 | 7/2004 | Corrigan |
| 2004/0196858 A1 | 10/2004 | Tsai |
| 2004/0203756 A1 | 10/2004 | Lin |
| 2004/0259531 A1 | 12/2004 | Wood et al. |
| 2005/0004968 A1 | 1/2005 | Mononen |
| 2005/0064884 A1 | 3/2005 | Dumont |
| 2005/0132060 A1 | 6/2005 | Mo |
| 2005/0141522 A1 | 6/2005 | Kadar |
| 2005/0186974 A1 | 8/2005 | Cai |
| 2006/0053197 A1 | 3/2006 | Yoshimura et al. |
| 2006/0194595 A1 | 8/2006 | Myllynen |
| 2010/0257241 A1 | 10/2010 | Hale |

OTHER PUBLICATIONS

Appendix A, "Short Message Peer to Peer (SMPP) Interface Specification," 09588460, Jun. 6, 2000.

U.S. Appl. No. 61/314,432, filed Oct. 2000, Holmes.

Java-Centric Distributed Computing by Wollrath, A et al..; IEEE, vol. 17 Issue 3, May-Jun. 1997, pp. 44-53.

* cited by examiner

WEB GATEWAY MULTI-CARRIER SUPPORT

This application is a continuation of U.S. application Ser. No. 09/716,944, to SMITH et al., entitled "Web Gateway Multi-Carrier Support," filed on Nov. 22, 2000, which is incorporated herein by reference.

BACKGROUND OF THE INVENTION

1. Field of the Invention

This invention relates generally to wireless carriers, Internet service providers (ISPs), and information content delivery services/providers. More particularly, it relates to gateways between a wireless network and the Internet for routing messages to wireless devices.

2. Background of Related Art

Short Message Service Centers (SMSCs) deliver short messages through wireless networks. Typically they operate on highly valuable server platforms that are protected deep within a wireless carrier's network, and communicate via specialized protocols.

Figure 5:
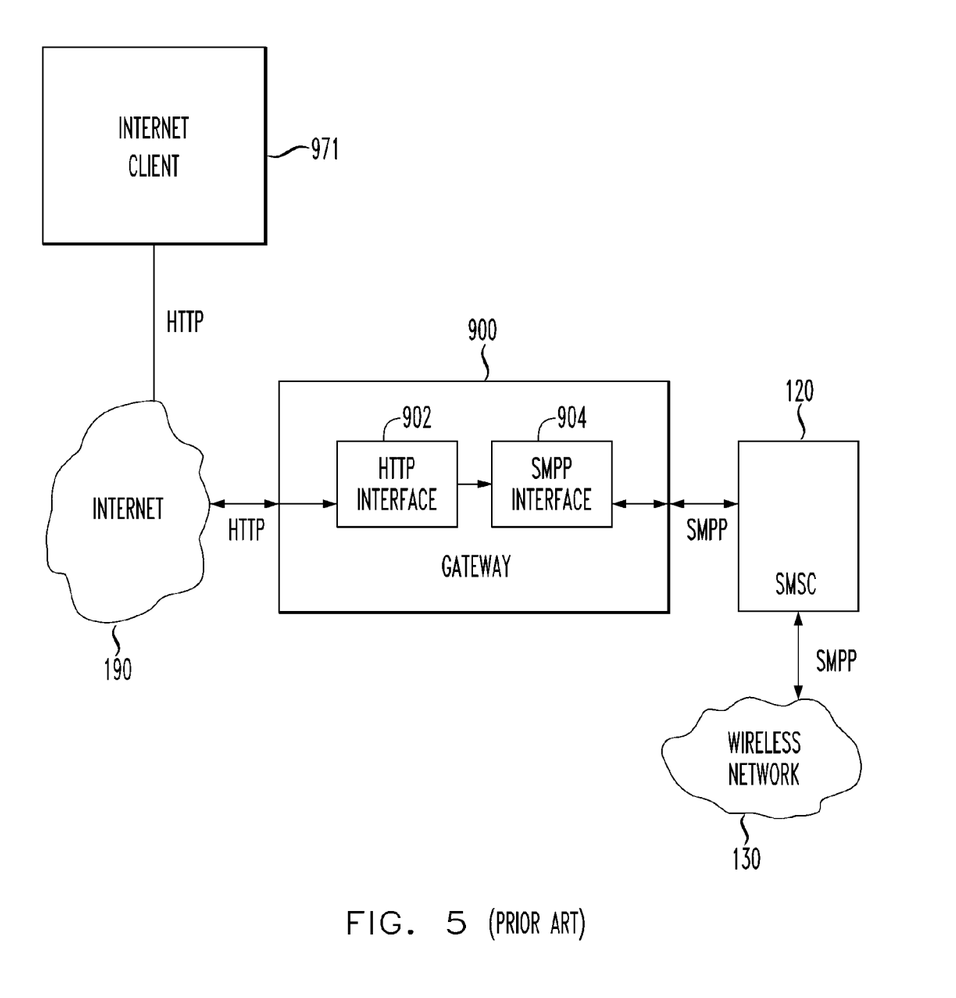
FIG. 5 shows a conventional gateway providing Internet access to a wireless network through a short message service center (SMSC).

FIG. 5 shows a conventional gateway providing Internet access to a wireless network through a short message service center (SMSC).

In particular, as shown in FIG. 5, a gateway 900 implemented in a wireless network translates between HTTP protocol messages, SMPP protocol messages, and/or email messages from wireless devices serviced by one Carrier's wireless network 130 via an SMSC 120, and devices serviced by another Carrier's wireless network through another gateway 971 on the Internet 190.

Conventional gateway 900 architecture provides a communication path between fixed protocol types, e.g., between HTTP protocol messages and SMPP protocol messages, based on known formats of destination Carriers. Separate gateway application programming interfaces (APIs) are developed to communicate with other protocol types, and those separate API's are conventionally 'hard-coded' into the gateway 900.

For instance, to pass communications from devices in the wireless network 130 serviced by a first carrier to devices in another wireless network serviced by another carrier, the gateway 900 formats the messages in a way which is known to conform to the needs of the other carrier using the other gateway 971.

Unfortunately, as any particular wireless carrier's resources change, software updates may be required in a transmitting gateway to conform to the format of the newly changed receiving carrier's gateway. This requires the sending gateways to undergo a tremendous amount of development work as a result of the addition of new network elements, particularly wireless network elements.

In conventional systems, every carrier to which a short message may be transmitted to has its own class file. Thus, if there are, e.g., one hundred (100) carriers accessible from a particular wireless network, then the gateway application code will necessarily include, e.g., one hundred (100) class files, one for each carrier.

Of course, as time goes on, some new carriers may enter a wireless network, some existing carriers may change configurations, and still other carriers may leave a wireless network. Each of these events relating to any of the carriers requires new or updated source code (e.g., new java code) in the sending gateway relating to a change in the relevant class file. This results in additional effort and/or down time in the gateways of one or all gateways between wireless networks and the Internet to accommodate the changes and/or additions to adjust the relevant application program class files.

There is a need for a technique and architecture to provide a unified means for routing message destinations to the gateways of other wireless carriers.

SUMMARY OF THE INVENTION

In accordance with the principles of the present invention, a short message distribution center comprises an incoming message queue, a carrier format table, and a destination link. The carrier format table comprises information relating to a plurality of different carrier formats each relating to a destination gateway of a relevant destination carrier.

A method of abstracting destination carrier format from a wireless Internet gateway in accordance with yet another aspect of the present invention comprises receiving an incoming short message. Destination carrier information is retrieved from the incoming short message. Destination carrier format information is retrieved from a carrier format table based on a match to the retrieved destination carrier information.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Multi-Carrier support is a feature of a wireless Internet gateway (WIG) that allows the WIG to send messages to any number of 'peer' gateways on the Internet in a conveniently reconfigurable manner. In accordance with the principles of the present invention, the WIG includes a 'Message Distribution Center' (MDC), through which short messages can be routed to the gateways of other wireless carriers based on carrier formats stored in an abstracted carrier format table. The conventional technique of separate classes written for each carrier is replaced by entries in a look-up table format, to provide a more easily adaptable wireless gateway.

Thus, in accordance with the principles of the present invention, occasional updates of the carrier format table need only be updated, rather than the wireless Internet gateway program, reducing down time for updates, reducing the complexity of updates, and improving the reliability of a wireless Internet gateway in the face of changes for one or more carriers in a wireless network.

A suitable wireless Internet gateway is disclosed in co-owned U.S. application Ser. No. 09/630,762, filed Aug. 2, 2000, entitled "Wireless Internet Gateway", to Richard Smith, the entirety of which is expressly incorporated herein by reference.

The present invention enables a WIG to communicate with the gateways of other carriers (particularly other wireless carriers) having different and occasionally changing kinds of message destinations using different and occasionally changing protocols.

In accordance with the principles of the present invention, information regarding other carriers (i.e., destinations) may be added, changed, and/or removed from a wireless short messaging system network by simply modifying a configuration property file relating to message formats for each other carrier, rather than the conventional technique of providing each carrier with its own class, avoiding the conventional need to reprogram relevant sending gateways.

Figure 1:
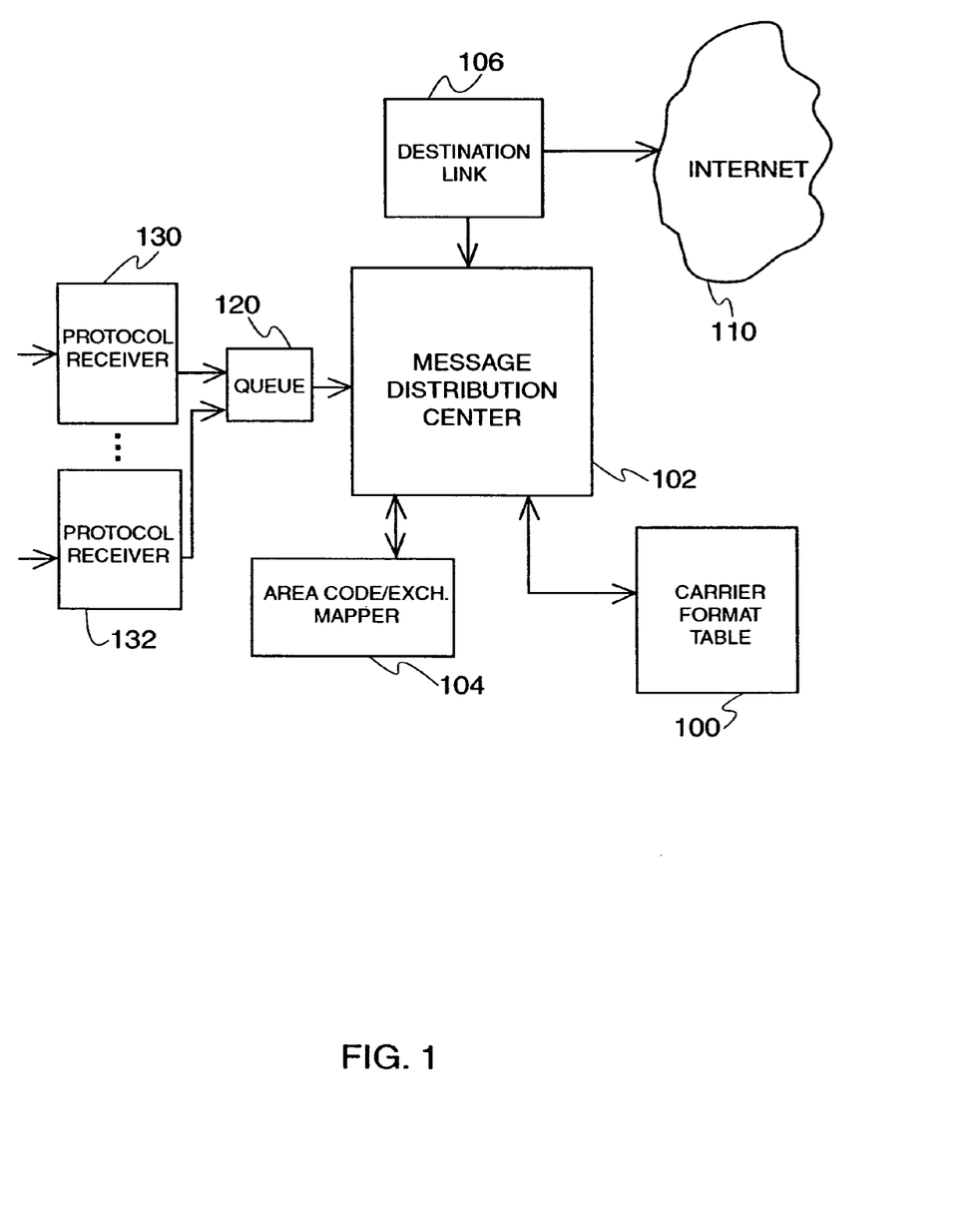
FIG. 1 shows an exemplary message distribution center in a wireless gateway including a carrier format table and destination link, in accordance with the principles of the present invention.

FIG. 1 shows an exemplary message distribution center in a wireless gateway including a carrier format table and destination link, in accordance with the principles of the present invention.

In particular, as shown in FIG. 1, short messages of various protocols are received by respective protocol receivers 130-132, and fed into a message queue 120. The various protocol receivers may relate, e.g., to email, HTTP get, etc. A message distribution center 102 portion of a wireless Internet gateway receives the queued short messages from the message queue 120, e.g., on a first come-first served basis.

The queued messages are interrogated by the message distribution center 102 to determine their destination carrier. One appropriate interrogation method is, e.g., in the case of a page or voice message, to map the area code and exchange number of the destination telephone number to a particular carrier. This is performed in the area code/exchange mapper 104, in communication with the message distribution center 102.

The WIG may determine the destination gateway by the area code and exchange of the destination device (NPA/NXX). For example, short messages to numbers beginning with 443994 are automatically routed to AT&T Wireless Services™. For devices with non-10 digit destination numbers (e.g., some pagers), standard numbers are prefixed to the actual destination in order to make it 10 digits.

In accordance with the principles of the present invention, once a carrier is determined from the short message, the preferred format and other carrier specific information is determined from a carrier format table 100. Then, given the carrier specific information obtained from the carrier format table 100, the messages are sent to a destination link 106 for transmission via the appropriate protocol to the appropriate destination via the Internet 110.

In the disclosed embodiments, the carrier format table 100 includes a carrier property configuration file or carrier format file, e.g., 'GWDEST.properties'. The GWDEST.properties file is used to define carriers in a wireless short messaging system, together with the particular properties that go along with each carrier.

While the present embodiment describes a carrier property file named GWDEST.properties, the carrier format table may have any name within the scope of the present invention. The GWDEST.properties file specifies the various settings that are necessary to support a particular carrier.

The internal queue 120 simply sends messages to a generic Interface, which can be implemented in any number of ways. The interface defines basic messaging requirements, such as 'sendTextMessage' and 'makeConnection'.

A WIG in accordance with the principles of the present invention is able to support multiple destinations (carriers) in an easily updatable fashion because the potential carrier destinations are internally abstracted away from their associated protocols. For the multi-carrier support feature in accordance with the principles of the present invention, the destination link interface 106 transparently routes short messages to other destination objects representing each possible peer gateway. Peer gateway objects are created from classes that capture the underlying protocol to use. For example, SMTP, HTTP Post and HTTP Get.

The carrier format table 100 configuration file preferably includes the universal resource locator (URL) and form field names, together with information regarding whether the carrier is communicated with, e.g., using HTTP GET, HTTP POST, or Email.

In the disclosed embodiment, carrier specific properties of all carriers in a network are entered into the carrier format table, e.g., into the GWDEST.properties file. The GWDEST.properties file may be updated on a periodic basis as necessary, without the need to affect other operations of the gateway.

The following is an example configuration file called GWDEST.properties, including destination information for seven (7) carriers. Of course, the principles of the present invention relate to a configuration file containing fewer or many, many more carrier entries, e.g., hundreds. Note that the number of entries for each carrier may change, depending upon the particular carrier.

```
numOfCarriers=7
0_className=tcs.ain.smsgw.gwdest.GWDestHttpGet
0_carrierName=AT
0_carrierNameLong=AirTouch
0_baseURL=http://webmsg.airtouch.com/cgi-bin/smspowerband_parse_genmail
0_maxLen=120
0_numFields=3
0_fieldNum0=min NUM
0_fieldNum1=callback from
0_fieldNum2=message MSG
1_className=tcs.ain.smsgw.gwdest.GWDestHttpGet
1_carrierName=AMT
1_carrierNameLong=Ameritech
1_baseURL=http://paging.acswireless.com/cgi-bin/page.cgi
1_maxLen=120
1_numFields=5
1_fieldNum0=miscVar template=paging
1_fieldNum1=miscVar email=httpd@ameritech.exmachina.comm
1_fieldNum2=min pin
1_fieldNum3=callback from
1_fieldNum4=message message
2_className=tcs.ain.smsgw.gwdest.GWDestHttpPost
2_carrierName=ATT
2_carrierNameLong=AT&T Wireless
2_baseURL=http://www.mobile.att.net/mc/mc_pagersend.cgi
2_maxLen=110
2_numFields=5
2_fieldNum0=miscVar htmlsource=nonMsg.html
2_fieldNum1=min pin
2_fieldNum2=miscVar returnpage=default
2_fieldNum3=callback from
2_fieldNum4=message message
3_className=tcs.ain.smsgw.gwdest.GWDestHttpGet
3_carrierName=BAM
3_carrierNameLong=Bell Atlantic Mobile
3_baseURL=http://www3.bam.com/cgi-bin/sms/sms.cgi
3_maxLen=120
3_numFields=5
3_fieldNum0=miscVar msg_type=messaging
3_fieldNum1=areaCode area_code
3_fieldNum2=exchange exchange
3_fieldNum3=extension extension
3_fieldNum4=message message
4_className=tcs.ain.smsgw.gwdest.GWDestHttpGet
4_carrierName=BS
```

```
4_carrierNameLong=BellSouth
4_baseURL=http://www.sms.bellsouth.com/sendnow.cgi
4_maxLen=155
4_numFields=2
4_fieldNum0=min min
4_fieldNum1=message msg
5_className=tcs.ain.smsgw.gwdest.GWDestEmail
5_carrierName=PB
5_carrierNameLong=PacBell
5_maxLen=110
5_baseURL=@pacbellpcs.net
5_appendDigits=1
6_className=tcs.ain.smsgw.gwdest.GWDestEmail
6_carrierName=OT
6_carrierNameLong=Omnipoint
# append a '1' to the number for the email address
6_appendDigits=1
6_baseURL=@omnipoint.net
6_maxLen=60
```

To show the flexibility of the GWDEST.properties file, and the carrier format table 100 in general, the following is an alternative entry for carrier No. 6:

```
# This is the web page link for Omnipoint.
#6_className=tcs.ain.smsgw.gwdest.GWDestHttpGet
#6_carrierName=OT
#6_carrierNameLong=OmniPoint
#6_baseURL=http://www.omnipoint.com/cgi-bin/message.cgi
#6_appendDigits=1
#6_maxLen=60
#6_numFields=2
#6_fieldNum0=min phone
#6_fieldNum1=message message
```

Each carrier entry in the exemplary configuration file 100 may start with the carrier's ID number as set in an appropriate database.

The ClassName currently takes one of three forms, although additional forms may be possible. The ClassName relates to the method of communication to the relevant carrier.

In the disclosed embodiment, a ClassName of GWDestHttpGet indicates that the carrier communicates with an HTTP GET command, and handles carriers that use HTTP GET. A ClassName of GWDestHttpPost indicates that the carrier communicates with an HTTP POST command, and handled carriers that use HTTP POST. A ClassName of GWDestEmail indicates that the carrier communicates via Email, and handles carriers that use email.

The CarrierName parameter may be 2 or 3 letter code unique to the particular carrier.

The CarrierNameLong parameter may be the full proper name of the particular carrier.

The MaxLen parameter may be used to indicate the maximum length of the short message which may be supported by the relevant carrier.

The BaseURL parameter may be the URL used for messaging with the particular carrier.

The numFields parameter is the number of form fields that the carrier's messaging page has.

The format for the fieldNumX properties may be as follows:

X_fieldNumY=ourVariableName theirVariableName, where ourVariableName can be any of the following types: min, callback, subject, message, priority, areaCode, exchange, extension, phoneNumber, and miscVar.

As disclosed, the carrier's variables are mapped into the variables of the sending carrier. The sub-parameter miscVar may be used for any variable that does not have a dynamically assigned value. When the URL is generated, it is spit out as is.

Figure 2:
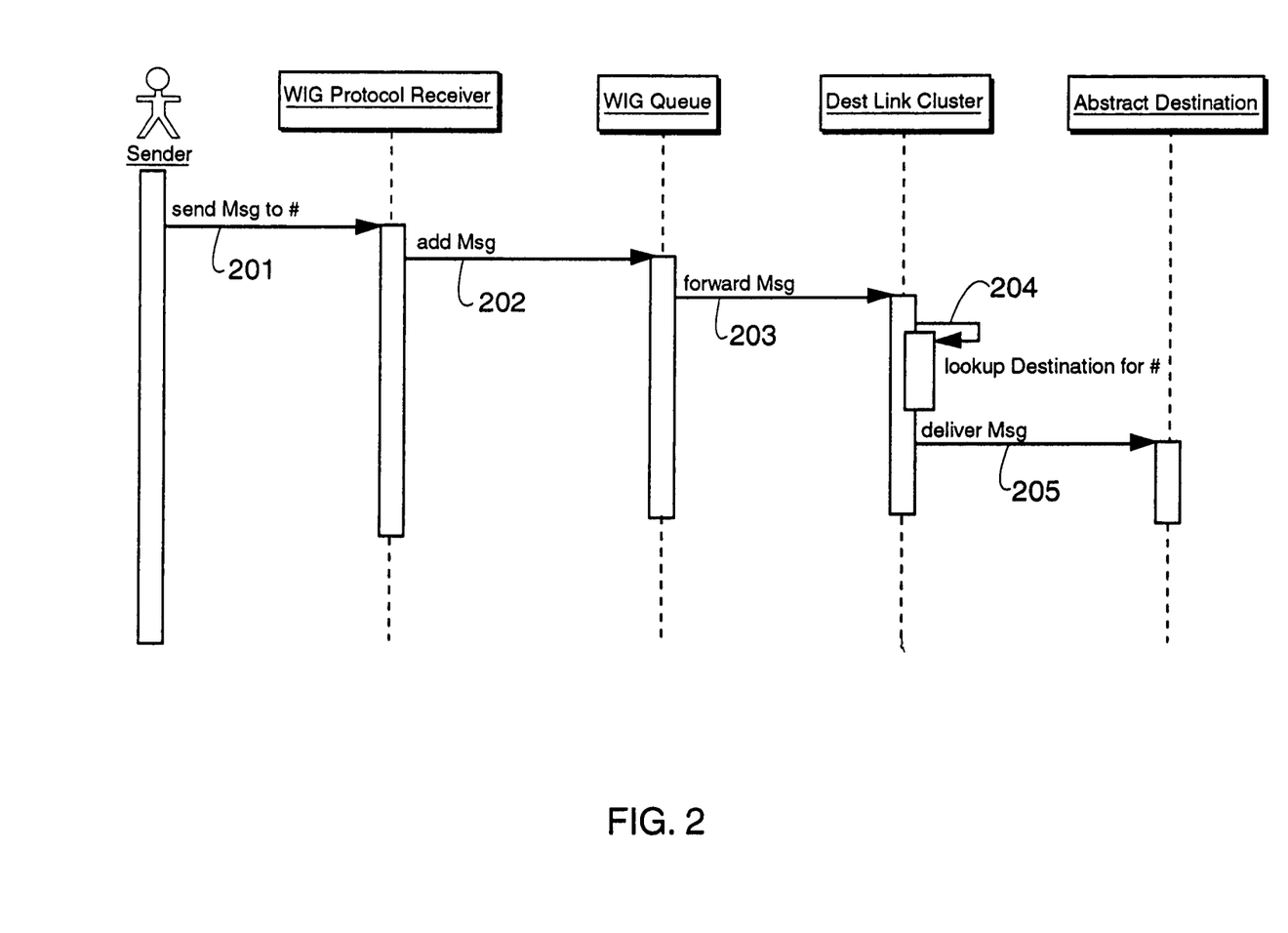
FIG. 2 shows an exemplary overview of message flow relating to the message distribution center shown in FIG. 1.

FIG. 2 shows an exemplary overview of message flow relating to the message distribution center shown in FIG. 1.

In particular, as shown in FIG. 2, a message is sent by the sender to one of the protocol receivers 130-132, as shown in message 201.

The relevant protocol receiver 130-132 adds the message to the queue 120, as shown in message 202.

In message 203, the message is forwarded by the queue 120 to the message distribution center 102.

The message distribution center 102 interrogates the message to determine the intended destination, and looks up the particular destination from an appropriate database, e.g., the area code/exchange mapper 104, as depicted in message 204.

In message 205, the message distribution center 102 delivers the message to the abstracted destination link 106, for delivery to the relevant destination.

The present invention focuses on the use of a carrier format table 100 by the destination link 106 to obtain the appropriate format for the destination carrier. In particular, "multi-carrier support" relates to the definition and use of special classes in the "Abstract Destination" (IGWSNLink) that know how to deliver messages to various "Peer" wireless internet gateways using, e.g., SMTP, HTTP, or other (even future) protocols.

Figure 3:
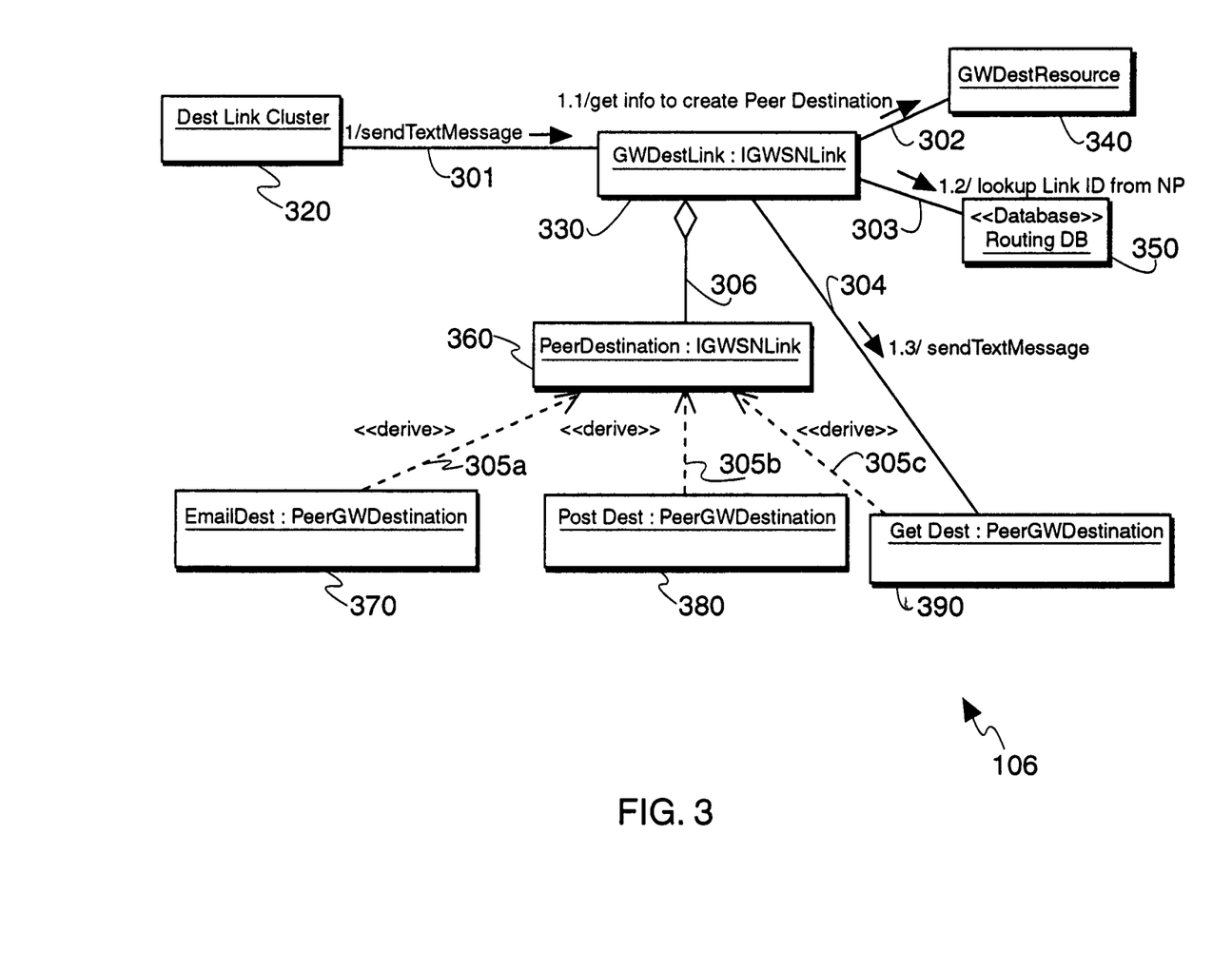
FIG. 3 shows an exemplary destination link and related modules of a wireless gateway such as that shown in FIG. 1.

FIG. 3 shows an exemplary destination link 106 and related modules of a wireless Internet gateway such as that shown in FIG. 1.

The destination link 106 includes a destination link cluster module 320, a Gateway destination link module called GWDestLink:IGWSNLink 330, a GWDestResource 340, and a Routing Database 350. The destination link 106 also includes peer modules, including a PeerDestination:IGWSNLink 360 which utilizes an appropriate format module, e.g., Email Dest:PeerGWDestination module 370 which communicates via email, Post Dest:PeerGWDestination module 380 which communicates via POST commands, and Get Dest:PeerGWDestination module 390 which communicates via GET commands.

As shown in FIG. 3, a message may be sent to the destination link GWDestLink 106. The message is sent using, e.g., a sendTextMessage 301, to the GWDestLink 330.

The GWDestLink 330 aggregates many peer destinations. For instance, the GWDestLink 330 gets information from a GWDestResource 340, to create a peer destination, as shown in message 302. The GWDestResource 340 may be used to dynamically create peer destinations and to assign attributes such as which servers to communicate with, the format to use to communicate, etc.

As shown in message 304, the GWDestLink 330 forwards the message to the appropriate peer destination which is to handle transmission of the message to another gateway over the Internet 110 using the appropriate protocol, e.g., Email, HPPT post, etc., which in turn provide an appropriate message 305*a*-305*c* to the PeerDestination:IGWSNLink module 360.

Figure 4A:
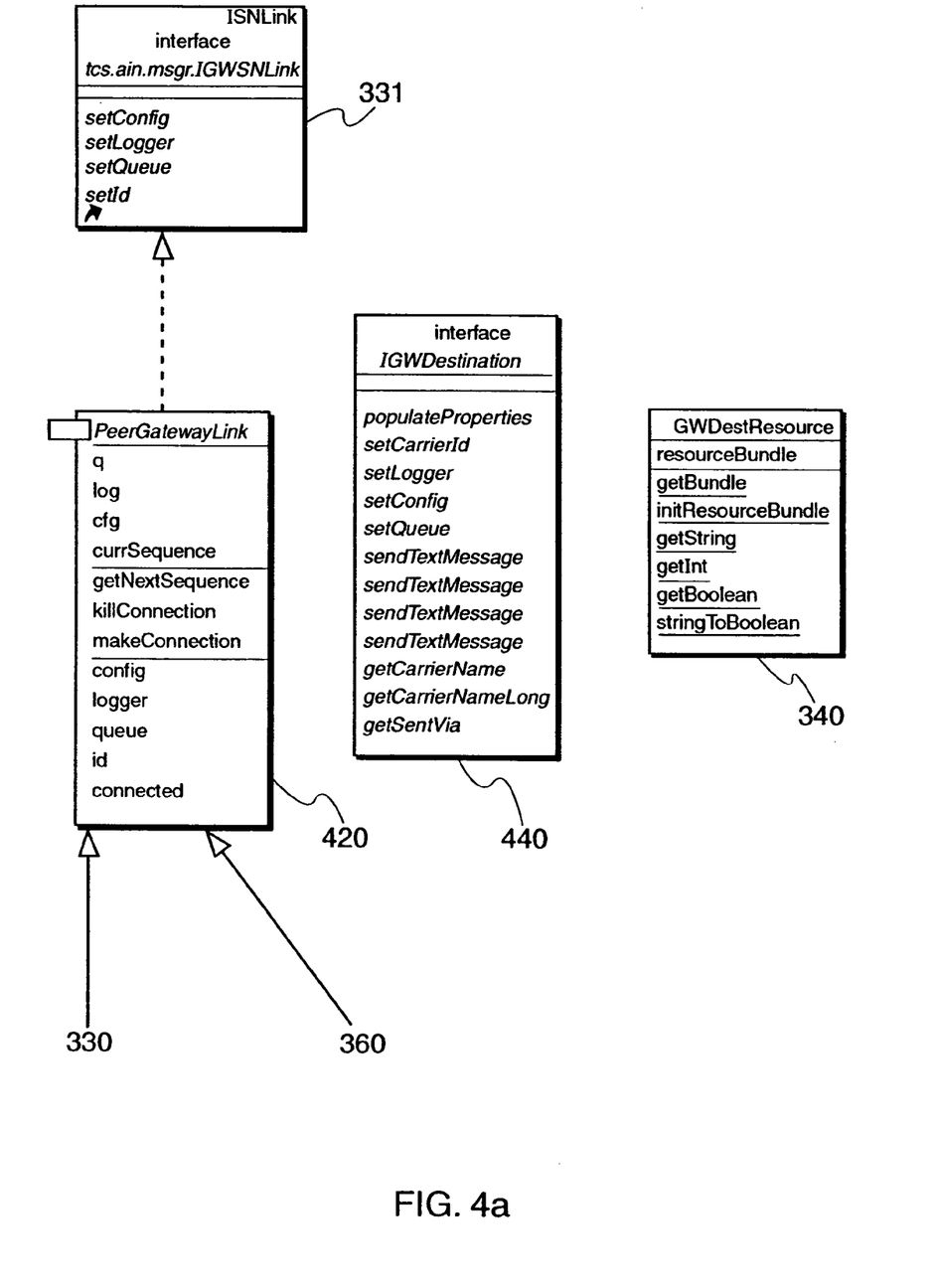
FIG. 4 shows an exemplary implementation of the destination link and related modules shown in FIG. 3.
Figure 4B:
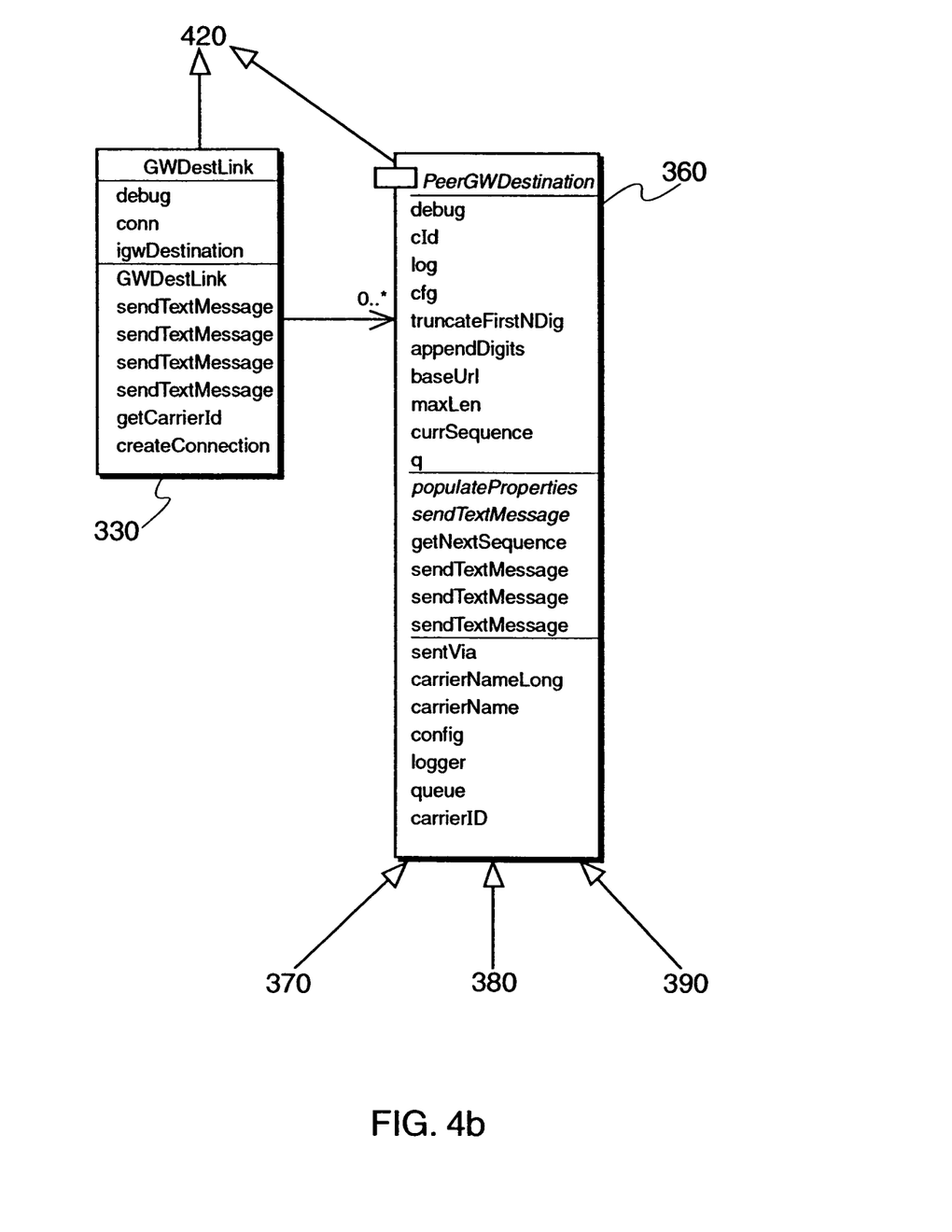
Figure 4C:
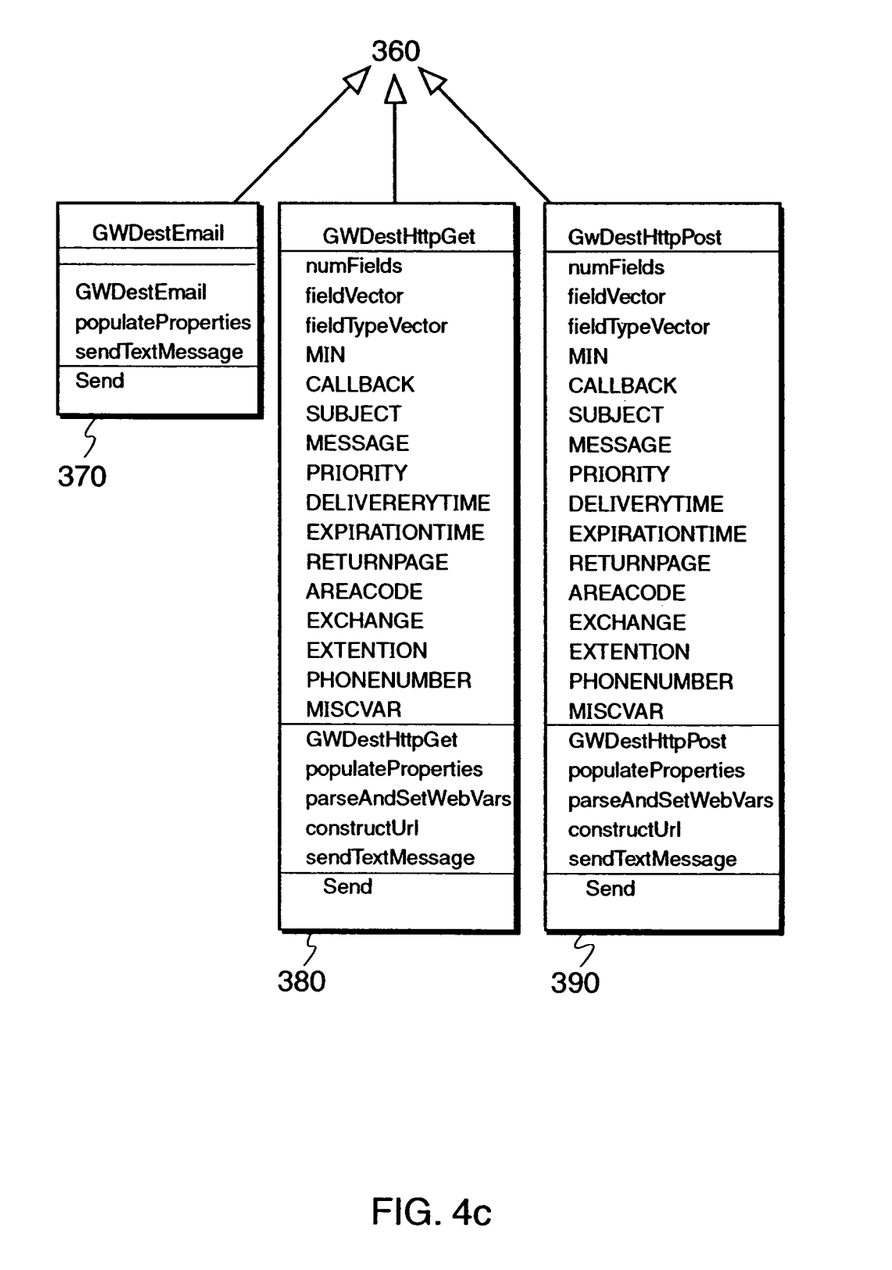

FIG. 4 shows an exemplary implementation of the destination link and related modules shown in FIG. 3.

The enabling WIG technology disclosed here allows short messages (e.g., email, voice mail, HTTP post, etc.) to be transparently routed to the appropriate destination gateway using a configurable carrier format table. It also allows the message length to be formulated to reflect the destination, e.g., a 400-character message can be sent in whole to a Bell South IPS pager, whereas the same message would be split into 4 separate 100 characters messages when sent to a Sprint Phone.

While the invention has been described with reference to the exemplary embodiments thereof, those skilled in the art will be able to make various modifications to the described embodiments of the invention without departing from the true spirit and scope of the invention.

What is claimed is:

1. A gateway, comprising:
a dynamically updateable carrier format table associating a plurality of carriers serviced by said gateway and network types and protocols of particular ones of said plurality of carriers;
a physical message distribution center to interrogate an incoming message to said gateway to determine an external remote physical destination carrier gateway;
a destination identification addressing module to address said incoming message to said external remote physical destination carrier gateway in accordance with information retrieved from said dynamically updateable carrier format table; and
a destination link interface to transparently route said received and queued messages to said external remote physical destination carrier gateway, said external remote physical destination carrier gateway being selected for each said received message based on carrier specific information obtained from said dynamically updateable carrier message format table.

2. The gateway according to claim 1, further comprising:
at least one protocol receiver.

3. The gateway according to claim 1, further comprising:
an email message receiver.

4. The gateway according to claim 1, further comprising:
an HTTP protocol message receiver.

5. The gateway according to claim 1, further comprising:
an SMPP protocol message receiver.

6. The gateway according to claim 1, wherein said destination identification addressing module comprises:
an area code/exchange number to destination carrier mapper to map an area code/exchange number of a message received in said incoming message queue to a format of said external remote physical destination carrier.

7. The gateway according to claim 1, further comprising:
an interface to an Internet.

8. The gateway according to claim 1,
wherein:
said gateway is a wireless internet gateway.

9. A method of facilitating movement of a message between networks, comprising:
accessing a dynamically updateable carrier format table associating a plurality of carriers serviced by a physical message distribution center gateway and network types and protocols of particular ones of said plurality of carriers;
interrogating an incoming message at said physical message distribution center to determine a destination address associated with said incoming message;
interrogating said dynamically updateable carrier format table to determine an external remote physical destination carrier gateway associated with said destination address;
addressing said incoming message to said external remote physical destination carrier gateway in accordance with information retrieved from said dynamically updateable carrier format table; and
transparently routing said addressed incoming message to said external remote physical destination carrier gateway, said external remote physical destination carrier gateway being selected for each said incoming message based on carrier specific information obtained from said dynamically updateable carrier message format table.

10. The method according to claim 9, further comprising:
generating a peer destination class based on information retrieved from said dynamically updateable carrier format table.

* * * * *